Sept. 8, 1936. J. E. KENNEDY 2,053,340
PULVERIZED FUEL APPARATUS
Original Filed July 11, 1927   3 Sheets-Sheet 2

Joseph E. Kennedy
INVENTOR.

BY Charles A. Clark.
ATTORNEY.

Sept. 8, 1936.  J. E. KENNEDY  2,053,340
PULVERIZED FUEL APPARATUS
Original Filed July 11, 1927   3 Sheets-Sheet 3

Joseph E. Kennedy
INVENTOR.

BY Charles A. Clarke
ATTORNEY.

Patented Sept. 8, 1936

2,053,340

UNITED STATES PATENT OFFICE 2,053,340

PULVERIZED FUEL APPARATUS

Joseph E. Kennedy, New York, N. Y., assignor to Nellie Kennedy, New York, N. Y.

Application July 11, 1927, Serial No. 204,914
Renewed March 14, 1934

9 Claims. (Cl. 110—104)

My invention relates to pulverized fuel apparatus and more particularly refers to the means utilized in the treatment of the pulverized fuel before it is consumed in a furnace.

One object of my invention is to utilize the excess air from a cyclone collector for combustion purposes.

Another object of my invention is to provide means for passing the excess gases found in pulverized fuel storage bins into the combustion chamber of a furnace.

A still further object of my invention is to provide means whereby all of the impalpable dust or powder associated with the pulverization of fuels, is directed into the combustion chamber of a furnace.

It is well known in the art that the excess air and the pulverized fuel from cyclone collectors have been allowed to escape into the atmosphere and the pulverized fuel is precipitated in and over the buildings, causing explosions, resulting in casualties and death of operators, destruction of buildings and property and in the loss of the best part of the pulverized fuel, namely, the impalpable powder.

Various methods of water spraying, etc., have been employed in attempts to overcome this menace and loss, none of which have been successful and one of the most valuable features of my invention consists of the means removing the cause of this menace.

With these and other objects in view, my invention consists of the novel construction, arrangement of parts, and the method of operation hereinafter referred to, described, claimed and substantially as illustrated in the accompanying drawings, wherein similar numerals refer to like parts throughout the several views, in which—

Figure 1:
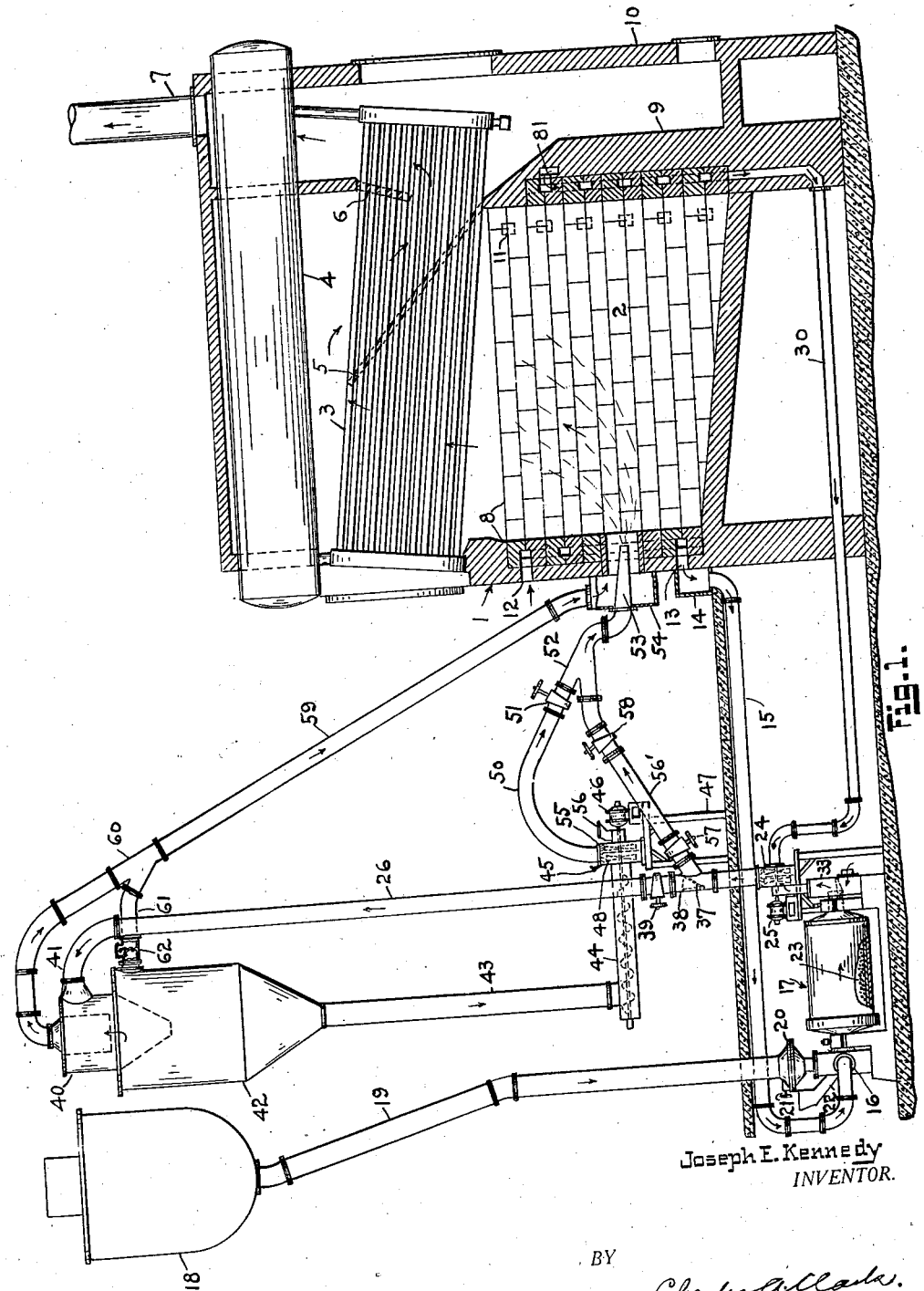
Figure 1 is an elevation, partly in section of one form of the apparatus.

In the embodiment of the invention illustrated in the drawings, the furnace 1 comprises a combustion chamber 2 having front and side walls with air heating passages therein, a bridge wall 9 also having air heating passages therein and a back wall 10, and having an outlet connected with a stack 7 for the products of combustion, the products of combustion being directed in a circuitous passage to the stack by baffle plates 5 and 6, with a bank of boiler tubes 3 and connected drum 4 superposed to the combustion chamber.

Figure 3:
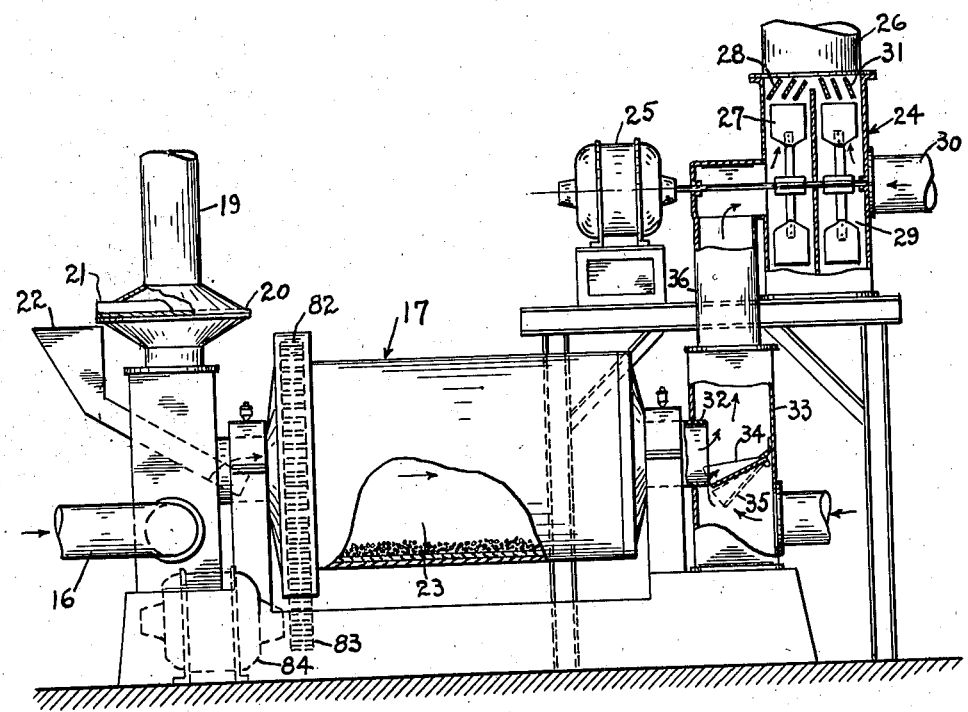
Figure 3 is an elevation, broken away, of a pulverizer.

The air cooled front and side walls 8, are provided with air inlets 11 and 12, and an air outlet 13 leading to a collecting manifold 14, and a pipe 15 directs the preheated air into the inlet side 16 of a pulverizing mill 17, which may be driven by a gear 82 meshing with a pinion 83 on the shaft of a motor 84, as clearly shown in Figure 3.

Figure 2:
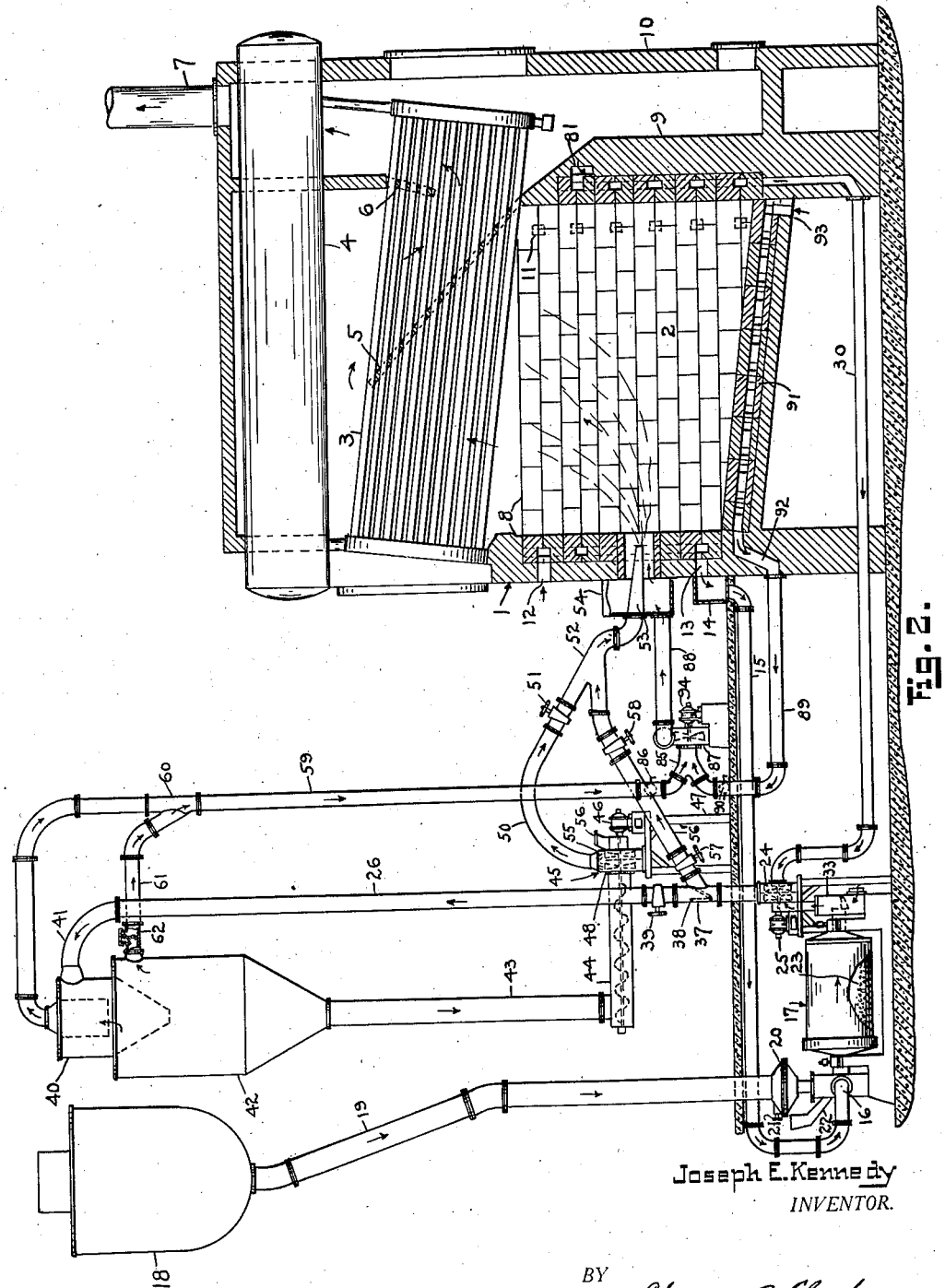
Figure 2 is an elevation, partly in section of a modification of the structure shown in Figure 1.

As shown in Figures 1 and 2 the fuel supply bin 18, feeds fuel through the pipe 19, to a disc 20, provided with a means 21 to feed the fuel therefrom into a hopper 22, which directs the fuel into the drum 23 of the pulverizing apparatus 17.

The pulverized fuel from the pulverizing apparatus 17, is preferably moved by a duplex fan 24, driven by the motor 25, into the pipe 26, as clearly shown in Figure 3.

The one half part 27 of the said duplex fan 24 moves the pulverized fuel through the apparatus 17 against the baffles 28, and the air is taken into the other half part 29 of the said duplex fan 24 through the pipe 30, which is connected to the air cooling passages in bridge wall 9, through the inlet 81, the air from pipe 30 being directed by the baffles 31 against the stream of entrained pulverized fuel; so that the two are intimately and thoroughly mixed together.

Referring to Figure 3, the operation of this part of the apparatus is as follows:—The air preheated in passing through the passages in the front and side walls of the furnace enters the pulverizing mill 17, through the pipe 16, passes into the pulverizing part of the pulverizing mill and takes up in transit the pulverized fuel therein, and the fuel and air mixture then passes through the outlet 32 into the air box 33 provided with an adjustable damper or valve 34, as shown clearly in Figure 3 in the closed position in full lines and by the dotted lines 35 in the open position.

This valve 34 admits additional air in regulatable volume to the box 33 for mixture with the pulverized fuel carrying air stream flowing from the mill through the outlet 32, and this mixture passes up the pipe 36 into one side 27 of the duplex fan 24, from whence it is deflected to the center of pipe 26 by the baffles 28, and the preheated air from the bridge wall moved by the other side 29 of this duplex fan 24 is directed by the baffles 31 to mix with the pulverized fuel and air diverted by the baffles 28, as hereinbefore described.

In Figures 1 and 2, the cyclone separator 40, precipitates the pulverized fuel into a collecting and storage bin 42, from whence the pulverized fuel is fed by the pipe 43, to a screw conveyor 44.

The blades of a duplex fan 45 are fixed on the shaft of the screw conveyor 44 and the shaft is driven by a motor 46, said fan and motor being mounted on a support 47. One end of the screw conveyor is in connection with an opening in one side 48 of the casing of the fan 45 and is operative to feed material from the bin to the fan and the material in suspension in an air stream is delivered by the fan to a pipe 50 and is diverted toward the center of said pipe by baffles immediately above the fan blades similar to the baffles 28 shown in connection with the blades 27 of the fan 24, and causing said stream delivered by the fan to thoroughly mix with a stream of air caused to flow by blades 55 of the duplex fan 45 through an inlet 56 in the side of the fan casing opposite to the side 48, said air delivered by the fan being directed toward the center of the pipe 50 by baffles immediately above the fan blades 55 similar to the baffles 31 shown in Figure 3 in connection with the blades 29 of the fan 24. The pipe 50 is connected in communication with the nozzle or burner 53 through a Y-fitting 52 and is controlled by a valve 51.

Connecting the Y fittings 38 and 52, is a bypass pipe 56', provided with the valves 57 and 58, so that when the valves 37, 39 and 51 are in closed position and the valves 57 and 58 are opened, the pulverized fuel will pass directly into the combustion chamber 2 of the furnace 1 through the Y fitting 38, valves 57 and 58, bypass pipe 56', Y fitting 52, and the nozzle 53.

When the valves 57 and 58 shut off the direct connection of the burner with the delivery of the fan, and the valves 37, 39 and 51 are opened, the pulverized fuel from the pulverizing apparatus 17 will be delivered through the pipe or conduit 26 and elbow 41 into the cyclone separator 40 and the separated pulverized fuel collected and stored in bin 42. The outlet of the pulverized fuel bin is connected by pipe or conduit 43 with the screw conveyor 44 by which the fuel is fed from the bin to the fan 45, which mixes air with the pulverized fuel fed thereto and delivers the fuel in suspension in an air stream through the pipe or conduit 50 and valve controlled connection 51, 52 to the burner 53 for combustion in the combustion chamber of the furnace 1. In the arrangement of Figure 1 a pipe or conduit 59 connected to and leading from the top of the separator is connected with the box 54 opening to the furnace through the burner opening, whereby to discharge excess air mixed with dust or powder in suspension therein from the separator into the combustion chamber 2 of the furnace 1. The storage bin 42 is also connected from adjacent the top by a by-pass pipe 61 through a Y-fitting 60 with the conduit 59, the by-pass pipe 61 having a back pressure valve 62 interposed in the connection thereof with the bin operative by the pressure in the bin to control the connection of the bin with the conduit 59 so that should the pressure within the bin 42 be higher than the pressure in the conduit 59, the valve 62 will open and equalize the pressure in the bin and conduit 59 by by-passing the air with dust or powder in suspension therein into the conduit 59, from whence it is directed into the combustion chamber 2 of the furnace 1 through the box 54 connected with the conduit 59.

In the arrangement of Figure 2 instead of the pipe 59 communicating directly with the air box 54 means is interposed in the connection of said pipe 59 with the air box to induce the flow of excess air from the separator and bin to said air box 54, and means are provided to supply additional air to said means to induce the flow of excess air from the separator and bin to be delivered by said means to the air box 54 and combustion chamber 2 as a secondary air supply to the burning fuel. For this purpose there is provided a third fan 87 actuated by a motor 94, the outlet of the fan being connected with the air box 54 by a conduit 88. The pipe 59 is connected with a branch of a Y-coupling 85 connected to the intake of the fan, and the flow of the air through the pipe 59 to the fan is regulated by a damper 86. The other branch of the Y-coupling 85 is connected by a conduit 89 to a pipe 92 connected with air heating passages 91 in the floor of the furnace having an air inlet 93, the flow of the air through the conduit 89 to the fan being regulated by a damper 90.

Having thus described and illustrated the preferred embodiment of my invention, I do not wish to limit myself to the exact construction or arrangement shown, since it is evident that modifications may be made without departing from the spirit of the invention or scope of the claims.

I claim—

1. The combination of a pulverized fuel apparatus and a furnace, including a pulverizer, means to feed fuel to the pulverizer, a fan with its intake conduit leading from said pulverizer, a cyclone separator, a conduit operably connected between said fan and cyclone separator, a pulverized fuel bin in communication with said separator, a pulverized fuel burner, an air box enclosing said pulverized fuel burner, said burner and air box communicating with the furnace, a conduit operably connected between said separator and air box, a conduit connecting said pulverized fuel bin with the said burner and a bypass conduit with a back pressure valve therein operably connected to the pulverized fuel bin and to the conduit between the separator and the air box.

2. The combination of a pulverized fuel apparatus and a furnace with hollow walls, including a fuel supply bin, a fuel feeder, a conduit operably connected between said bin and feeder, a pulverizer receiving fuel from said feeder, a conduit operably connected with the inlet of said pulverizer and to the spaces between the hollow walls of said furnace, a fan with its intake conduit leading from said pulverizer, a cyclone separator, a conduit operably connected between said fan and cyclone separator, a pulverized fuel bin operably connected to said separator, a pulverized fuel burner, an air box enclosing said pulverized fuel burner, said burner and air box communicating with the furnace, a conduit operably connected between said separator and the air box, and a conduit connecting the pulverized fuel bin with the said burner.

3. The combination of a pulverized fuel apparatus and a furnace having hollow walls, including a pulverizer having an inlet, a conduit operatively connecting the inlet of the pulverizer and the hollow furnace walls, a fan with its intake conduit leading from said pulverizer, a conduit operably connected with the inlet of the fan and hollow furnace walls, a cyclone separator, a conduit operably connected between said fan and cyclone separator, a pulverized fuel bin connected to said separator, a pulverized fuel burner, an air box enclosing said pulverized fuel burner, said burner and air box communicating with the furnace, a conduit operably connected between said separator and the air box, and a conduit connected between the pulverized fuel bin and the burner.

4. In apparatus for preparing, feeding and burning pulverized material, a furnace having an opening through its wall and arranged with passages in the wall for the circulation and heating of air, a burner mounted in the furnace opening, a bin, a cyclone separator having its outlet in communication with the bin, a pulverizing mill, a duplex fan having its intake operatively connected with the mill to draw air to and a pulverized material laden air stream from the mill, conduits connecting the outlet of said fan with the burner and separator, valves interposed in said conduits to connect and shut off either one of said conduits from the outlet of the fan, means in communication with the air passages in the furnace wall and the mill for mixture of air with pulverized material therein, and with the fan for mixture with the material laden air stream drawn from the mill and delivered therewith to the conduits, a second fan, means in communication with the bin and intake of the second fan to receive pulverized material from the bin and convey the same to said fan, a conduit in communication with the outlet of said second fan and the burner, a valve interposed in said conduit to connect and shut off the burner from said conduit, a third fan, a conduit connected at one end with the outlet of said third fan and the opposite end connected in communication with the opening in the furnace wall, and a pair of conduits each connected at one end in communication with the intake of the third fan, the opposite end of one of said conduits being connected in communication with the separator and bin and the opposite end of the other of said conduits being connected in communication with the air passages in the furnace wall, and said third fan being operative to induce the flow of excess air from the separator and bin and air from the furnace wall passages to the furnace opening as secondary air to the burner.

5. In apparatus for preparing, feeding and burning pulverized fuel, a furnace having an opening through its wall and arranged with passages in the wall for the circulation and heating of air, a burner mounted in the furnace opening, a pulverizing mill, a duplex fan having its intake connected with the mill and operative to draw air to and a pulverized laden air stream from the mill, a conduit in communication with the air passages in the furnace wall and the mill for the passage of said air to the mill for mixture with the pulverized material therein, a conduit in communication with said air passages and the intake of the fan for the passage and mixture of air with the pulverized material laden air stream delivered by the fan, a separator, conduits placing the outlet of the fan in communication with the separator and burner, valves in said conduits operative to connect and shut off the conduits from the outlet of the fan and the burner from the conduit connected thereto, a bin in communication with and adapted to receive material from the separator, a second fan, a conduit in communication with the outlet of said second fan and the burner arranged with a valve to connect and shut off the burner from said conduit, means in communication with the intake of the second fan and bin to receive pulverized material from the bin and operative to feed said material to the intake of the fan for mixture with air and delivery in suspension in an air stream to the burner, a third fan, a pair of conduits each connected at one end in communication with the intake of said third fan, the opposite end of one of said pair of conduits being connected in communication with the separator and bin and the opposite end of the other of said pair of conduits connected in communication with the air passages in the furnace wall, and a conduit in communication with the outlet of said third fan and the opening in the furnace wall, the fan being operative to induce the flow of air from the passages in the furnace wall and excess air from the separator and bin to the furnace opening as a secondary air supply to the burner.

6. In apparatus for preparing, feeding and burning fuel, a furnace having an opening through the wall, a burner mounted in the furnace opening, a pulverizer, a cyclone separator, a fan connected at its intake with the pulverizer and its outlet connected with the burner and separator, valves in the connections of the fan with the burner and separator to control the connections of the fan with the burner and separator, a bin connected to the separator to collect the separated pulverized material delivered from the separator, a second fan, a conduit connected with the outlet of said second fan and the burner, a valve operative to connect and shut off the burner from said latter conduit, means to receive pulverized material from the bin and feed the same to the intake of said second fan, a conduit connected to the separator communicating with the furnace opening for the delivery of excess air from the separator as secondary air to the burner, a pipe connecting the bin in communication with said conduit, and a valve in said pipe normally closing said pipe and shutting off said conduit from the bin and actuated by the pressure in the bin to open said pipe and place the bin in communication with the conduit through said pipe.

7. In apparatus for preparing, feeding and burning pulverized fuel, a furnace having an opening in the wall thereof and passages arranged in the wall for the circulation and heating of air, a burner mounted in the furnace opening, a pulverizing mill, a fan having the intake connected with the mill operative to draw air into and deliver a pulverized material laden air stream from the mill, a cyclone separator, a pair of conduits connected to the outlet of the fan, one of said conduits communicating with the separator and the other conduit communicating with the burner, a valve operative to shut off the conduit communicating with the separator from the outlet of said fan, valves operative to shut off the conduit communicating with the burner from the fan and shut off the burner from said conduit, conduits connected with the air passages in the furnace wall communicating with the mill and intake of the fan for the passage of said air to the mill for mixture with the pulverized material and to the fan for mixture with the stream delivered by the fan, a bin connected with the separator to collect and store pulverized material delivered from the separator, a second fan, a conduit connected to the outlet of said second fan and communicating with the burner, a valve operative to shut off the burner from said latter conduit, and a screw conveyor connected to the intake of the second fan and the bin to feed material from the bin to the second fan for delivery by said fan to the burner.

8. In apparatus for preparing, feeding and burning pulverized fuel, a furnace having an opening through the wall, a burner mounted in said opening, a separator, a pulverizing mill, means to feed fuel to be pulverized to the mill, a fan having the intake in communication with the mill operative to draw air into and a pulverized material laden air stream from the mill, a pair of conduits connected with the outlet of the fan, one of said conduits communicating with the separator and the other conduit communicating with the burner, a valve operative to shut off the conduit communicating with the separator from the outlet of the fan, valves operative to shut off the conduit communicating with the burner from the outlet of the fan and shut off the burner from said conduit, a bin in communication with and to receive pulverized material from the separator, a second fan, a conduit connected with the outlet of said second fan and communicating with the burner, a valve operative to shut off the burner from said latter conduit, means to feed material from the bin to the intake of the second fan for delivery by said fan to the burner, and a conduit connected with the separator and bin communicating with the furnace opening for delivery of excess air from the separator and bin as secondary air to the burner.

9. In apparatus for preparing, feeding and burning pulverized fuel, a furnace having an opening through the wall, a burner mounted in the furnace wall opening, a pulverizer, a fan having its intake connected with the pulverizer to draw a pulverized material laden air stream from the pulverizer, a separator, a conduit connected with the burner, a conduit connected with the separator, a Y-fitting connected with the outlet of the fan and said conduits connected with the burner and separator, a pin connected with the separator, a second fan having its intake connected with said bin and its outlet with the burner operative to deliver material from the bin to the burner in suspension in an air stream, valves to control the connections of the conduits connected with the burner and separator with the Y-fitting connected with the outlet of the first fan and the connection of the outlet of the second fan with the burner, a conduit connected with the separator and bin and with the burner opening in the furnace wall to deliver excess air from the separator and bin as secondary air to the burner, and a valve in the connection of said latter conduit with the bin operative by the pressure in the bin to control the connection of the bin with said conduit.

JOSEPH E. KENNEDY.